United States Patent [19]

Roderick

[11] 4,039,776

[45] Aug. 2, 1977

[54] CLOSED PASSAGE HEAT HOLDING APPARATUS

[75] Inventor: Ronald R. Roderick, Evergreen, Colo.

[73] Assignee: National Equipment Corporation, Denver, Colo.

[21] Appl. No.: 614,879

[22] Filed: Sept. 19, 1975

[51] Int. Cl.² .......................... A21B 1/22; F27D 11/02
[52] U.S. Cl. ................................ 219/401; 126/21 A; 126/273 R; 219/400; 219/386
[58] Field of Search ............... 219/385, 386, 392, 400, 219/401; 99/467; 107/7; 126/19 R, 21 R, 21 A, 273 R; 426/418

[56] References Cited

U.S. PATENT DOCUMENTS

| | | | |
|---|---|---|---|
| 2,164,265 | 6/1939 | Wilson | 219/400 X |
| 2,715,898 | 8/1955 | Michaelis et al. | 126/273 |
| 3,142,748 | 7/1964 | Warren | 219/400 X |
| 3,456,598 | 7/1969 | MacKay | 107/7 |
| 3,518,949 | 7/1970 | Stock | 107/7 |
| 3,868,941 | 3/1975 | Roderick | 126/19 R |
| 3,886,346 | 5/1975 | Meyers | 219/386 |
| 3,911,242 | 10/1975 | Buday et al. | 219/400 |

FOREIGN PATENT DOCUMENTS

| | | | |
|---|---|---|---|
| 305,061 | 4/1955 | Switzerland | 219/400 |
| 513,684 | 10/1939 | United Kingdom | 219/400 |

Primary Examiner—Volodymyr Y. Mayewsky
Attorney, Agent, or Firm—Ancel W. Lewis, Jr.

[57] ABSTRACT

An apparatus and method for holding food and the like at desired temperature and moisture levels for an extended period of time wherein there is provided a relatively still volume of air about the food which is heated by maintaining a regulated, temperature controlled, recirculating flow of heated air in a closed passage with the air heated by a controlled heating element and recirculated by controlled air blowers about said volume of air along at least two pairs of perpendicular axes and about a major portion of the external surface area of the volume of air without a direct contact of heated air flow with the food to provide substantially uniform heating by conduction and convection. A controllable source of moisture in the form of a water pan in open communication with the heated volume of air introduces controlled quantities of moisture into the heated volume of air. A control circuit regulates electric power to the heating element and blowers and includes an adjustable thermostat to vary the temperature range of the volume of air, a thermostat to maintain the blower on when the heating element is de-energized until the heated air cools, and a thermostat to de-energize the heating element in the event of excessive temperatures.

9 Claims, 9 Drawing Figures

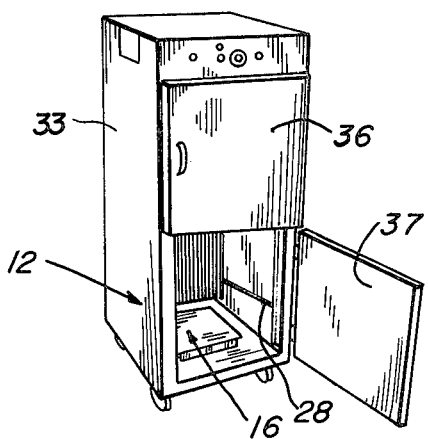
Fig_1
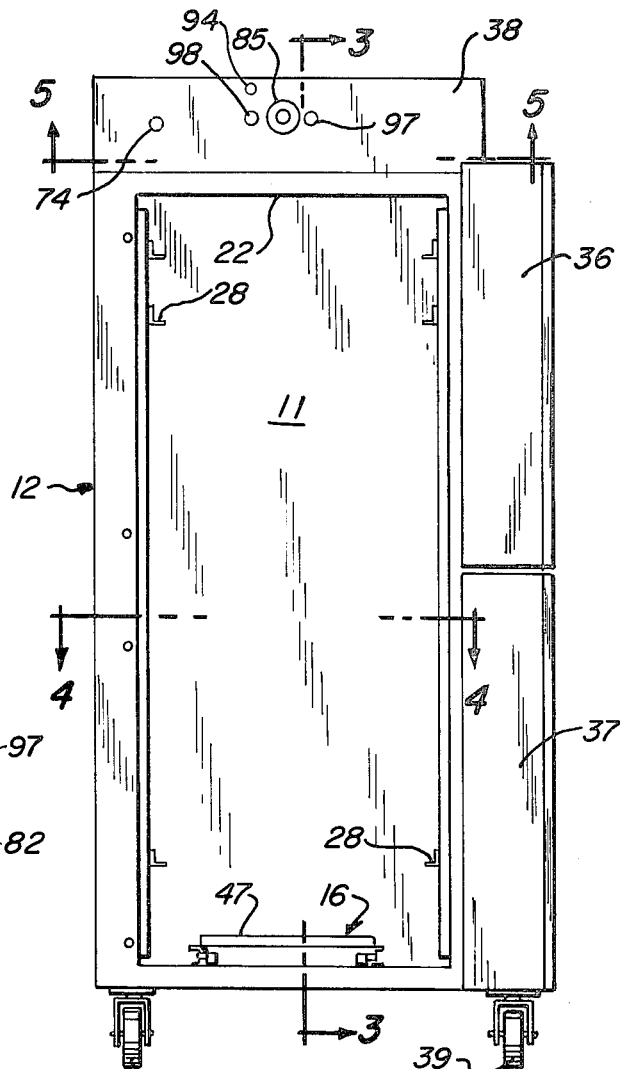
Fig_2
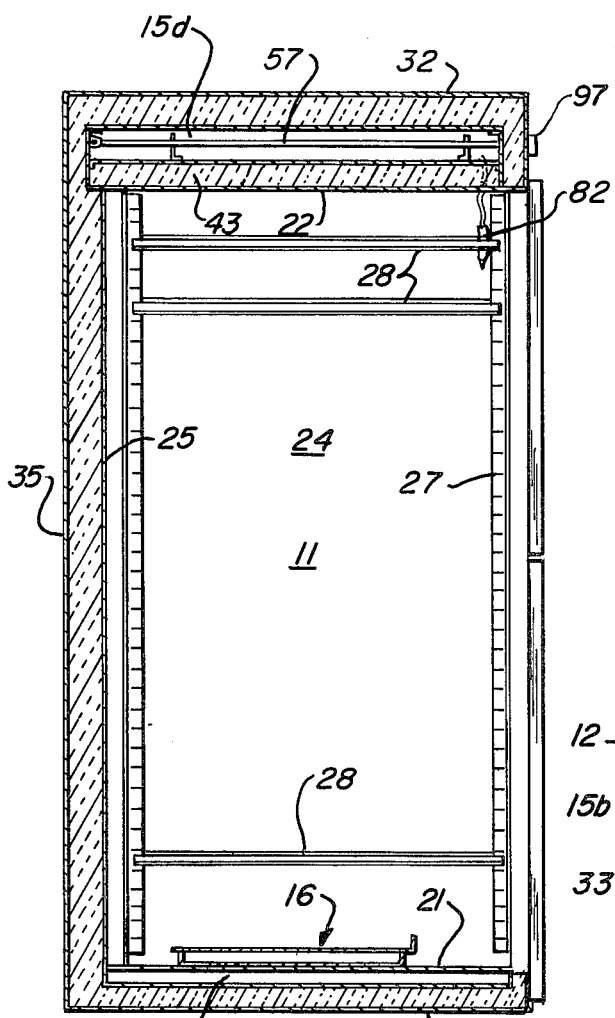
Fig_3
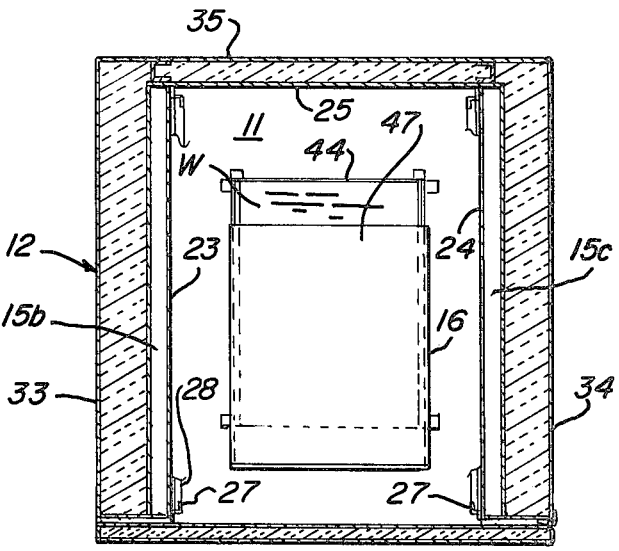
Fig_4

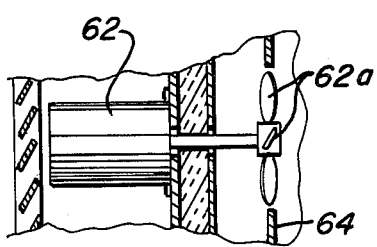
Fig_7
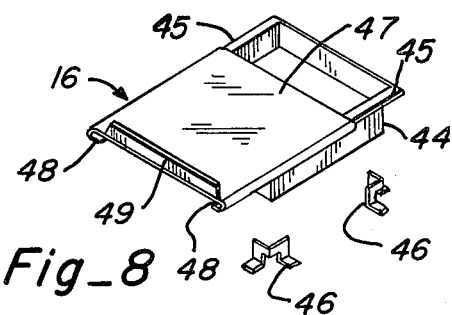
Fig_8
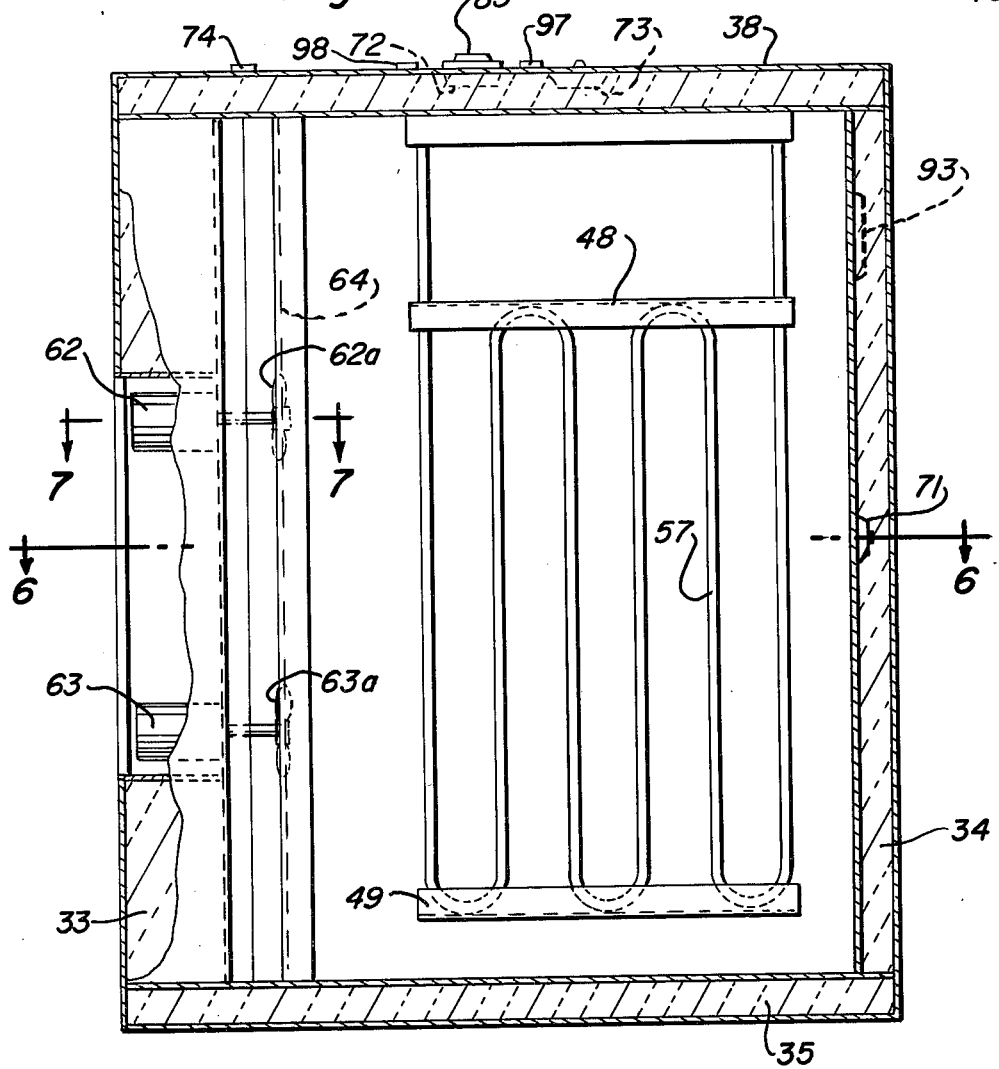
Fig_5

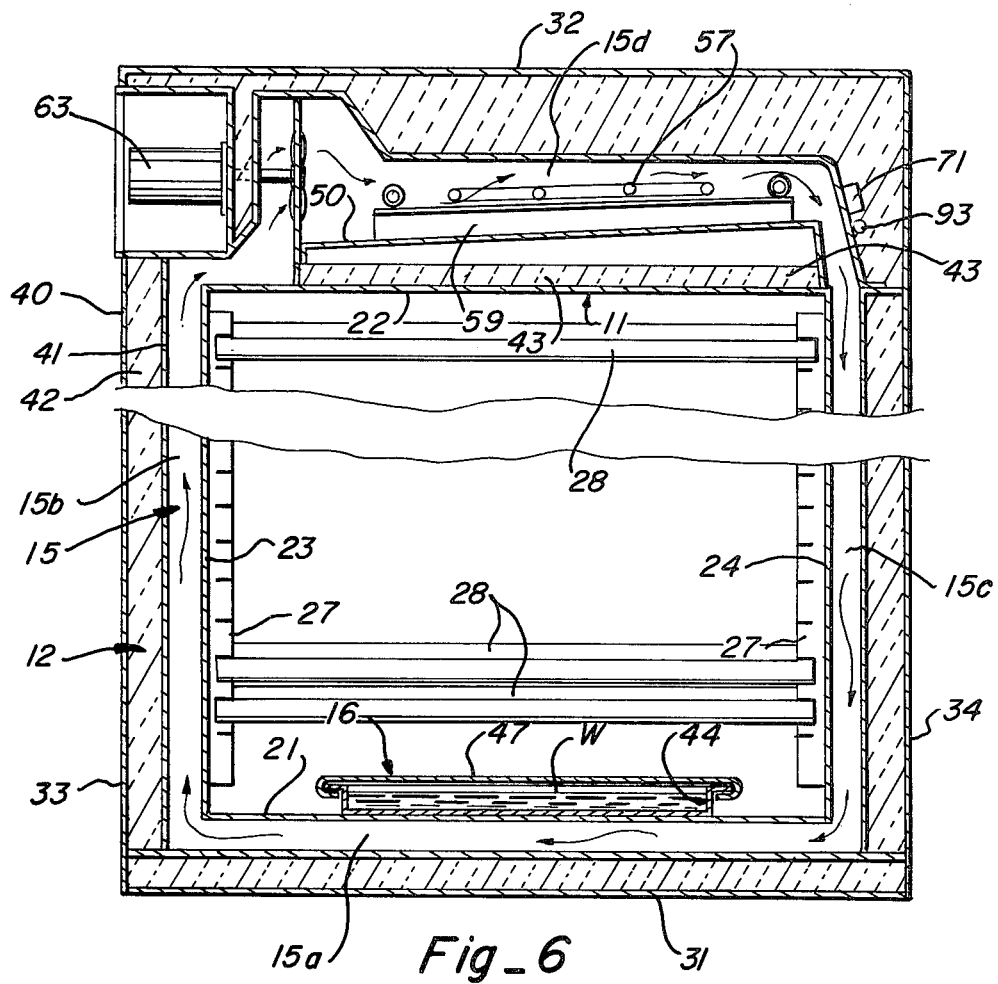
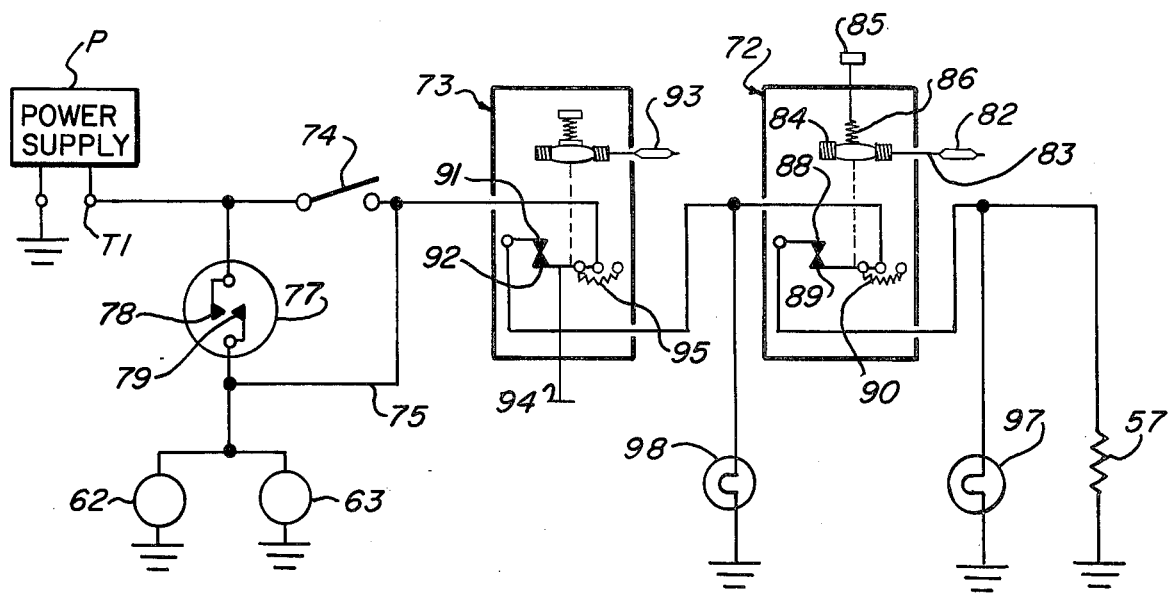

CLOSED PASSAGE HEAT HOLDING APPARATUS

FIELD OF THE INVENTION

This invention relates to a novel apparatus and method for holding heated food and the like at desired temperature and moisture levels for extended periods of time.

BACKGROUND OF THE INVENTION

The demand for techniques for holding food at selected temperatures and moisture levels for extended periods of time is widespread in the fast food industry. In this industry it is particularly important to maintain uniformity of heating within closely controlled ranges and introduce the proper amount of moisture into the heated chamber containing the food either to reconstitute the food or maintain a desired moisture level. Of particular importance in heating food is the avoidance of passing a significant air flow in direct contact with the food, which has deleterious effects particularly as it relates to drying out the food.

In earlier filed applications now U.S. Pat. Nos. 3,868,941 and 3,955,007, assigned to the assignee of the present invention, there is described one form of apparatus and method for holding food and the like wherein a relatively still volume of air is confined about a food using metal heat-conductive imperforate walls and an open passage around the walls maintains a flow of air heated by a gas burner below the confined volume of air in a generally outward, upward and inward course of travel with a top exhaust into the atmosphere. This circulation of the heated air is along the bottom, both sides and the top of the confined, still volume of air so as to be along at least two pairs of perpendicular axes and over major portions of the confined volume of air and produces substantially uniform heating of the volume of air and thereby the food contained therein by conduction and convection without a direct contact of the heated air flow with the food, which might otherwise cause undue drying out of the food.

In yet another U.S. application Ser. No. 536,456, filed Dec. 26, 1974, entitled "Display Apparatus and Method for Holding Food and the Like", assigned to the assignee of the present invention, there is described another form of apparatus and method wherein a relatively still volume of air is confined about a food within a flow of heated moisturized air directed in a vortex-like pattern with the still volume of air being the core of the vortex-like pattern and this pattern conveys heat and moisture to the core containing the food. Again this circulation of the heated air is along both sides, the front and rear walls forming the chamber so that heating takes place along at least two pairs of perpendicular axes and over a major portion of the volume of gas being heated and again produces substantially uniform heating without appreciable localized or spot heating at any one place and without a significant direct contact of the heated air flow with the food.

In both forms above described, a controllable source of moisture introduces controlled quantities of moisture into the confined volume of air during heating.

Accordingly, it is an object of this invention to provide a novel apparatus and method of holding food and the like at desired temperature levels utilizing a closed passage for circulating heated gases to transmit heat to the food while it is maintained in a substantially static or still volume of air with no substantial direct contact of air flow of heated gases with the food.

Yet another object of the present invention is to provide a novel apparatus and method of holding food and the like characterized by a closed heating, recirculating passage for maintaining a flow of heated air of a selected temperature about a volume of air along at least two pairs of perpendicular axes and about a major portion of the volume of air being heated to provide substantially uniform heating by conduction and convection.

Still a further object of the present invention is to provide a novel apparatus and method of holding food and the like that may be advantageously powered by electricity.

Other objects, advantages and capabilities of the present invention will become more apparent as the description proceeds taken in conjunction with the accompanying drawings, in which like parts have similar reference numerals and in which:

FIG. 1 is a perspective view of a heat-holding apparatus embodying features of the present invention;

FIG. 2 is a front elevation view of the heat-holding apparatus of FIG. 1 with the doors thereof moved to an open position to show interior construction;

FIG. 3 is a sectional view taken along lines 3—3 of FIG. 2;

FIG. 4 is a sectional view taken along lines 4—4 of FIG. 2;

FIG. 5 is a sectional view taken along lines 5—5 of FIG. 2;

FIG. 6 is a sectional view taken along lines 6—6 of FIG. 5 extending through the vertical extent of the entire apparatus;

FIG. 7 is a fragmentary sectional view showing the mounting of the fan in the top section;

FIG. 8 is a perspective, partially exploded view of the water pan shown; and

FIG. 9 is a schematic electric circuit diagram for controlling the electric heating element and blowers of the apparatus shown in FIGS. 1-8.

Referring now to the drawings, in the heat holding apparatus shown there is, in general, an inner compartment 11 confining a volume of air into which the food or the like is placed, an outer heat-insulated jacket 12 surrounding the inner compartment and arranged to define a closed passage 15 disposed about the compartment 11 together with a heating and circulating arrangement described in detail hereafter for moving heated air through the flow passage 15 to heat the air and thereby the food or the like in the compartment 11 by convection and conduction and a moisture source 16 in open communication with the air in the compartment to introduce a selected controllable amount of moisture into the heated air and food in the compartment 11.

The inner compartment 11 shown is generally box-shaped and comprised of a bottom wall 21, top wall 22, opposite side walls 23 and 24, and a back wall 25 with the front left open for access thereinto, these walls being closed or imperforate and made of a heat-conductive material, preferably sheet aluminum, whereby heat is transmitted or conducted therethrough to heat the air so as to maintain the confined volume of air in the compartment in a still condition during heating. Food support racks shown in the compartment 11 include corner supports 27 with vertically spaced slots and depending tray supports 28 extending from front to rear for supporting pizza trays and the like.

The outer heat-insulated jacket 12 comprises a bottom section 31, top section 32, opposed side sections 33 and 34 and back section 35 with an upper closure door 36 and a lower closure door 37 hinged to swing between open and closed positions to provide access into the compartment 11 and close off the front of the compartment 11 as required. The top section 32 has a front wall that forms a control panel 38. The bottom section 31 has wheels 39 mounted on the bottom wall at each corner to facilitate the movement of the apparatus as required.

As shown, all of the walls forming the jacket 12 are of a double-wall panel sandwich-type construction having an outer panel 40 and an inner panel 41 with heat insulation 42 therebetween as shown in FIG. 6, and for the back and the doors the compartment walls form the inner wall of the sandwich. The top section 32 has an inner layer of insulation 43 below the flow passage on the compartment top wall 22 for the heated air, as best seen in FIG. 6.

The flow passage 15 formed between compartment 11 and jacket 12 shown is coextensive with four of the six external walls or faces of the compartment 11 and includes a lower portion 15a, opposed side portions 15b and 15c and an upper portion 15d in flow communication with one another forming a closed passage through which the gases recirculate, as best seen in FIG. 6.

With the arrangement of the passage 15 relative to the compartment, a flow of heated air is maintained along a pair of perpendicular axes which are at points along the bottom wall and one side wall and along a second pair of perpendicular axes which are at points along the other side wall and top wall. In this way heating is effected from four opposite directions toward the center of the inner compartment first by conduction via the compartment walls and then by convection inside the compartment. By having the closed air flow passage separated from the confined volume of air in compartment 11 there is no air flow of heated gases in direct contact with the food. Moreover, since four of the six walls are heated, at least a major portion of the external surface of the confined volume of air is heated and this, with the direction of heating from four sides, contributes to uniformity of heating of the food and avoidance of concentration of heat at any one spot.

The moisture source 16 includes an open pan 44 resting on the bottom wall 21 containing water W, the pan 44 having an outwardly projecting flange 45 on each side, there being corner brackets 46 to secure the pan to the bottom wall 21. A slidable lid 47 has inturned flanges 48 spaced to encompass outturned flanges to guide the sliding movement of the lid relative to the pan. The lid further has an upturned flange 49 to facilitate the positioning of the lid relative to the pan to control or regulate the surface area of the water exposed and thereby control the amount of moisture evaporating into the confined volume of air in the compartment 11.

An electric resistance heating element 57 is mounted in the upper flow passage section 15d and is held at a slight incline in spaced relation above a lower panel 50 by spaced supports 58 and 59 to permit the air being heated to freely contact the heating element. The passage 15 is shaped to maintain a uniform flow. The heating element has a circular transverse cross section and is bent in a generally sinuous configuration, as best seen in FIG. 5.

The pressure source for the circulation of the heated gases in the flow passage 15 is provided by means of a pair of electric blowers 62 and 63 mounted side by side at one side of the top section 32 with the blower blades 62a and 63a, respectively, in a partition wall 64 having an opening slightly larger than the diameter of the fan blade 65.

Upon the actuation of the blowers 62 and 63 and heating element 57, a flow of recirculated heated air is passed through the closed passage 15. The blower forces the air over and around the heating element 57 in passage portion 15d, down passage portion 15c, across passage portion 15a, up passage portion 15b and back through the apertures in partition 64 in a closed loop, as shown by arrows in FIG. 6. The heated air is maintained at a steady controlled rate and this heated air is transmitted to the still volume of air in compartment 11 and thereby the food by conduction and convection. By passing along four opposite sides of the compartment a uniformity of heating of the food is achieved without causing a significant heated air flow to pass the food.

Referring now to the control circuit shown in FIG. 9, the heating element 57 and two electric blowers 62 and 63 are shown as the loads for an electric power supply P with an input terminal designated T1 of the control circuit connected to the output of the power supply and the power from the power supply to the heating element and blowers is regulated by an on-off electric control switch 74 coupled between T1 and the loads and physically positioned on the control panel 38 for ready access.

The blowers 62 and 63 are connected in parallel with one another and connect via a line 75 to the control switch 74 so that the blowers are actuated as soon as the switch 74 is closed. A temperature responsive thermostat 77 has a pair of contacts 78 and 79 connected between terminal T1 and the blowers ahead of switch 74. These contacts are normally open and close during normal operating temperatures and operate independently of the control switch to maintain the blowers on until the heated air drops below a selected lower temperature, at which time the contacts 78 and 79 open.

The heating element 57 connects to the control switch 74 via a variable thermostat 72 and a high limit thermostat 73 in a circuit that is arranged parallel with the blowers so that closure of the control switch 74 simultaneously actuates both the heating element and blowers under normal operating conditions.

The variable thermostat 72 includes a pair of contacts 88 and 89 connected between element 57 and the control switch 74 via thermostat 73 that are operable to open when heated gas temperatures rise above a selected temperature and close when the heated gas temperatures drop below a selected temperature to regulate the temperature range of the heated air. Thermostat 72 shown has a fluid-filled bulb located inside the heated compartment 11, as best seen in FIG. 3, sensing heated air temperatures and is connected by a capillary tube 83 to a bellows 84 which in turn is biased by a manually settable knob 85 via a spring 86, the knob 85 being located on the control panel. A spring 90 will move the contact 89 to an open position at a given bellows pressure. The turning of knob 85 varies the size of the bellows and thereby the condition at which the contacts will open. As the temperature in the bulb 82 rises the bellows expand and at a given knob setting the contacts open on a temperature rise and close on a temperature drop. A commercial unit suitable for use as thermostat 72 is Model SE 5300-041 manufactured by Robertshaw Controls Co.

The high limit control switch 73 is of a construction somewhat similar to that of thermostat 72 above described, but in place of the adjustable knob there is a set screw and spring that maintain a constant pressure on the bellows. This thermostat 72 is shown to have a pair of high limit contacts 91 and 92 connected between the control switch 74 and heating element 57 via contacts 88 and 89 that are normally closed during normal heating of the air in the passage. Thermostat 72 also has a bulb 93 located in the top section 32 as best seen in FIG. 3 sensing gas temperatures that are heated by the heating element. Thermostat 72 further has a capillary tube and bellows coupled to the movable contact 78 which in turn is biased toward open by a spring 95 whereby the bulb 93 senses temperatures and opens the contacts 91 and 92 when the temperature of the heated air in the compartment rises above a preselected temperature. A reset button 94 located on the control panel is used to close the contacts 91 and 92 once they have opened.

A pilot light 97 located on the control panel and connected across the heating element 57 indicates when the heating element is being energized. A signal light 98 also located on the control panel is connected between the high limit thermostat contacts 91 and 92 and the heating element to indicate when the contacts of the high limit switch are closed.

In a full sequence of operation for the circuit, when control switch 74 is closed the blowers 62 and 63 and heating element 57 are energized and the confined body of gas in compartment 11 is heated within a selected range as contacts 88 and 89 alternatively open and close in response to the temperatures of the confined body of air. In the event the blowers 62 or 63 fail and the temperature of the confined air reaches the selected higher temperature, contacts 91 and 92 would open to de-energize the heating element and stay open until the reset button 94 is pushed. When control switch 74 is finally moved to the open position the heating element is de-energized and the blowers 62 and 63 continue to run to circulate the heated gases, until a selected lower temperature for the confined gas is reached, at which time the contacts of thermostat 71 open and the blowers are de-energized. The cycle is repeated when control switch 74 is again closed.

During normal operation the temperature of the air in the compartment is maintained in the range of 170° to 200° F. The control thermostat 72 is usually set for about 170° F. and the contacts open at 174° F. and close at 166° F. The high limit control switch contacts open at about 450° F. and the contacts of the thermostat open at about 150° F.

Although the present invention has been described with a certain degree of particularity, it is understood that the present disclosure has been made by way of example and that changes in details of structure may be made without departing from the spirit thereof.

What is claimed is:

1. In holding apparatus for holding food and the like at desirable heat and moisture levels, the combination comprising:
    a. compartment means including an inner heat-holding compartment having walls made of imperforate heat-conductive material for confining a relatively still volume of air about a food and the like,
    b. heating means for said volume of air including an outer jacket arranged about said compartment means defining a closed passage arranged along at least two pairs of perpendicular axes and about a major portion of the external surface of said volume of air, said outer jacket having thermally insulated walls arranged entirely about the closed passage, a temperature-controlled heating element in said closed passage automatically adjusted in response to the temperature in said compartment in a selected temperature range, and a pressure source for recirculating heated air in said closed passage for maintaining a controlled flow of temperature-controlled, heated, recirculating air about said volume of air,
    and provide substantially uniform heating of the volume of air and thereby the food and the like therein by conduction and convection, and
    c. moisture supply means in open communication with said heated volume of air for introducing controlled quantities of moisture into said heated, confined volume of air.

2. In holding apparatus as set forth in Claim 1 wherein said compartment has a top, bottom and opposed side walls and another wall at right angles to said top, bottom and side walls, said walls being made of thin-walled sheet metal.

3. In holding apparatus as set forth in claim 1 wherein said pressure source is in the form of at least one blower means for recirculating the heated air in said passage.

4. In holding apparatus as set forth in claim 1 wherein said moisture supply means is in the form of a water pan having a cover adjustable to expose a selected surface area of water in said pan.

5. In holding apparatus as set forth in claim 1 including a control circuit for selectively regulating electric power from a power supply to said heating element and said pressure source.

6. In holding apparatus for food and the like, the combination comprising:
    a. an inner heat-holding compartment having walls made of a heat-conductive material for confining a relatively still volume of air about a food and the like and having at least one door for closing said compartment;
    b. an outer jacket means arranged about said compartment defining a closed passage arranged along two sets of perpendicular axes about the external surface of the compartment and about a major portion of the external surface area of the compartment, said outer jacket means having thermally insulated walls arranged entirely about the closed passage to provide substantially uniform heating of the body of gas in said compartment and thereby the food and the like therein by conduction and convection without significant heated air flow in contact with the food;
    c. a controllable heat source for heating air in said passage in a selected heat range;
    d. a controllable pressure source for recirculating the heated air in said passage for maintaining heated recirculating air about said volume of air; and
    e. a controllable source of moisture in open communication with the heated volume of air in the compartment to introduce controlled quantities of moisture thereinto.

7. In apparatus as set forth in claim 6 wherein said compartment is generally box-shaped having a top, bottom and opposed side walls, said closed passage extending around and being coextensive with said top, bottom and side walls, said heat source and pressure source being in flow communication with the passage at the top whereby air is forced over the heating element down along one side wall, across the bottom wall, up the opposite side wall and across the top wall in a closed recirculating pattern.

8. In holding apparatus as set forth in claim 6 wherein said heat souce is in the form of an electric heating element and said pressure source is in the form of at least one electric blower, said apparatus further including a control circuit for regulating electric power from a power supply to said electric heating element and said electric blower, said circuit including a control switch;
a first thermostat to maintain said blower on independently of said control switch until the gases heated by said heating element drop below a selected lower temperature;
a variable heat control member to regulate the power to said heating element to control the heating element within a selected temperature range; and
a second thermostat to decouple the heating element from the power supply when the temperature of the heated air rises above a selected temperature.

9. In holding apparatus for holding food and the like at desirable heat and moisture levels the combination comprising:

a. an inner compartment having top, bottom, opposed side walls and a rear wall, each wall being made of an imperforate sheet metal leaving the front open for access, for confining a still volume of air;
b. an outer jacket having a top section, a bottom section, opposed side sections and a back section with at least one closure door for the compartment adapted to swing between open and closed positions, said outer jacket being of a double-wall sandwich construction with heat insulation between two outer sheet metal panels, said outer jacket forming a closed flow passage about said inner compartment along said top, bottom and opposed sides thereof to maintain a flow of heated recirculating air about said compartment;
c. an electric heating element in the passage in said top section;
d. a blower having a blade in an aperture in a partition in said top section adapted to blow air over said heating element and through said passage;
e. a water pan containing water located in said compartment in open communication with said volume of air, said pan having a lid adjustable to expose a selected surface area of the water; and
f. a control circuit including control devices on a control panel on said top section for selectively regulating electric power from a power supply to said heating element and said blower.

* * * * *